Oct. 22, 1957  A. F. WILSON  2,810,198
LEVEL CONSTRUCTIONS
Filed May 23, 1957  2 Sheets-Sheet 1

Fig. 1   Fig. 2   Fig. 3

INVENTOR
Alonzo F. Wilson
BY Ralph J. Bassett
ATTORNEY

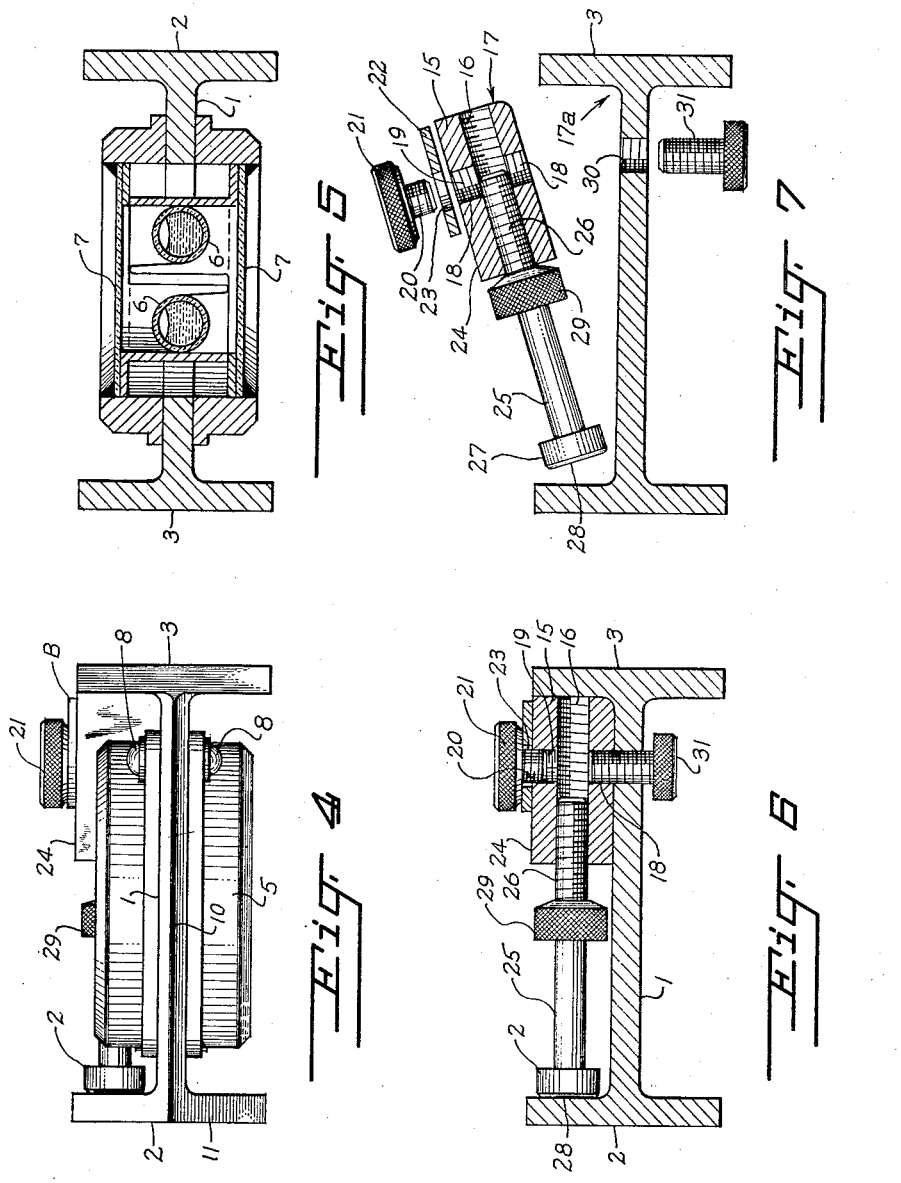

2,810,198
LEVEL CONSTRUCTIONS

Alonzo F. Wilson, Nampa, Idaho

Application May 23, 1957, Serial No. 661,116

5 Claims. (Cl. 33—88)

The invention relates to improvements in levels for use in masonry, carpentry and engineering.

One of the primary objects of the invention is the provision of scale markings on the level, these scale markings being suitable for use in the different arts in which the device may be utilized.

A further object of the invention comprehends the provision of scale markings that may be advantageous where carpenters and engineers work together on elevations.

A further object of the invention is the provision of a structure facilitating the use of the level as a plumb.

The present invention also comprehends the provision of a removable bevel square attachment.

These and other objects of the invention will more clearly hereinafter appear by reference to the accompanying drawings forming a part of the instant specification, wherein like characters of reference designate corresponding parts throughout the several views, in which:

Fig. 1 is a front elevation;

Fig. 2 is a side elevation showing the beveled lower extremity;

Fig. 3 is an opposite side elevation;

Fig. 4 is a bottom end view;

Fig. 5 is a section on line 5—5 of Fig. 1;

Fig. 6 is a transverse section showing the bevel attachment; and

Fig. 7 is a similar view showing the bevel attachment displaced.

The present assembly includes a central flat body 1 of elongated form, the length being determined by the use of the device and generally will approximate two to six feet in length, or longer. The central body or web 1 has along its outer marginal edges the flanges 2 and 3. The web 1 is provided with hand holes indicated at 4, these hand holes being arranged throughout the length of the structure to facilitate manipulation of the device. Properly spaced along the web 1 are the bubble level assemblies 5, the bubble tubes 6 being of the multiple type and generally arranged parallel as shown. The bubble level assemblies 5 are provided at suitable spaced points throughout the web 1 and alternately may be reversed ninety degrees so that level calculations can be made from either vertical or horizontal positions of the structure.

Where the bubble level assemblies 5 are arranged, windows 7 are provided to protect the structure and permit viewing to determine required calculations. The bubble level assemblies 5 are shown removably secured by screws 8 and if desired provision may be made for adjusting these levels as is conventional in the art. The flanges 2 and 3 are so manufactured as to provide straight edges in order to insure accurate determination of measurements during the use of the device.

At one end of the assembly, as best shown in Figs. 1 and 2, the lower end of the web 1 is beveled as at 10 and the front flange 2 is beveled as shown in Fig. 2 at 11, this bevel construction providing for more accurate use of a plumb in connection with the assembly. At the upper end of the assembly there is provided a bevel square attachment B, the details of which are illustrated in Figs. 6 and 7. This bevel square attachment is designed to be clamped between the flanges 2 and 3 of the web 1 and comprises a body member 15 having a threaded longitudinal bore 16 formed therein. This body member 15 is provided with an end surface 17 conforming to the inner surface 17a of one of the flanges, it being understood that the contour of the inner faces of these flanges are generally uniform to permit the attachment to be positioned selectively with respect to the body of the level. The body 15 is further provided with a transverse opening 18, this opening 18 being threaded as shown at 19 for receiving the threaded shank 20 of a thumb nut having a head 21. An opening 30 is formed in the web 1 to receive thumb nut 31 which engages the threads in opening 18 to secure the parts rigidly together when desired. The threads are preferably left hand so that the tendency to separate will be prevented when the bevel 22 is moved on its pivot.

Bevel square B is provided with an opening 23 for the passage of the threaded shank 20 of the thumb nut 21 and this thumb nut is used, as will be clear from Figs. 6 and 7, for clamping the bevel square B against the flat face 24 of the body 15. By this structure the bevel square B can be clamped into position and by loosening the thumb nut slightly can be adjusted as desired and then fixedly positioned. A bolt having an elongated body 25 threaded at its lower end 26 for threaded engagement with the threads 16 in the body of the member 15, is provided with a head 27 having its outer end 28 shaped to conform to the inner face of one of the flanges of the body of the level. A thumb nut 29 is appropriately positioned and threaded to the bolt body 25. With this structure the bolt 25 can be screwed into the body 15 a suitable distance to permit the insertion of the head 27 and of the face 17 within the flanges of the level body 1, and when in such a position by operation of the thumb nut 25 threaded on the body 15, the parts can be expanded so that the level holder is secured between the flanges 1 and 2, as shown in Fig. 6. The nut 29 locks the parts in place. When not in use the parts 25 and 15 may be telescoped together by rotation of the bolt 25 and the assembly removed.

The outer faces of the side walls of the level are provided with scales throughout their surfaces, these scales being appropriately arranged to facilitate the use of the device by masons, carpenters, engineers and others who may be working on a construction job in which various calculations must be quickly made. As shown in Fig. 2 the engineers' 100th—10th measure occupies one-half the surface and the other half of the surface will consist of one-sixteenth inch markings, both running the full length of the level. It will be noted that when a carpenter is working with an engineer and is given an elevation in 10th and 100th he can automatically note the inch and foot markings opposite the engineers' scale. It will be noted by examining the engineers' rule with the 16th combination measure that every three inches of 16ths, there are two tenths and five hundredths of engineers' scale, or three inches against two and one-half engineers' inches. The engineers' and inch markings run vertically from bottom to top. The lineal 16th measure shall be on the left half face of the level. On the opposite side of the level, and reversing ends of the level, there is imprinted on the surface the brick masons' spacing rule on the upper half and the lineal 12ths on the lower half of the level. These two measures are horizontal and each occupies one-half the width of the surface of the level, reading from left to right. These measurements will be helpful to masons and will overcome slip joint failures. The 12th measure will be useful to carpenters working on hypotenuse measures and other fine cuts. It will be noted that bevel square B has markings 33 for ninety degrees and markings 34 for forty-five degrees to facilitate the use of the device with respect to the flange 3.

What I claim is:

1. In a spirit level assembly, said assembly including a body portion of general I-form in cross section, the web of the body having mounted thereon a plurality of spirit bulb assemblies and the flanges having their outer faces provided with scale markings of various types permitting its reading in connection with masonry, carpentry and engineering, a bevel square attachment fixed between the flanges at one end of the body, said bevel square attachment including a body member formed with longitudinally and transversely threaded openings, the longitudinally threaded opening being associated with a stud adapted to be expanded into clamping engagement with the body between said flanges, and the transversely threaded opening providing for the attachment of the bevel square and a fastening screw, the latter extending through the web of the screw and into the transverse opening of the body.

2. The structure of claim 1 characterized in that the stud which is threaded into the longitudinally threaded opening includes a knurled nut medially of its length and an enlarged head portion, the nut being fixed to the stud to facilitate its rotation to expand the enlarged head and one wall of the body member into clamping engagement with the flanges.

3. The structure of claim 1 characterized in that the bevel square is clamped to the outer face of the body member by a stud and is further provided with markings for use in connection with the markings on said flanges to indicate predetermined angles when associated with the outer adjacent edge of one of the flanges.

4. The structure of claim 1 characterized in that the body member is provided with an end for snugly engaging the adjacent angular faces of the body portion of the spirit level assembly.

5. The structure of claim 1 characterized in that spirit bulbs are removably and replaceably positioned in the web of the body portion to facilitate their viewing from either side of the level assembly.

No references cited.